United States Patent
Schmidt

(10) Patent No.: US 9,294,324 B2
(45) Date of Patent: Mar. 22, 2016

(54) SIGNAL GENERATOR AND SIGNAL GENERATION METHOD WITH CYCLIC PREFIX GENERATION

(71) Applicant: Rohde & Schwarz GmbH & Co. KG, Munich (DE)

(72) Inventor: Stefan Schmidt, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 59 days.

(21) Appl. No.: 14/082,277

(22) Filed: Nov. 18, 2013

(65) Prior Publication Data

US 2015/0139291 A1    May 21, 2015

(51) Int. Cl.
*H04L 27/26* (2006.01)
*H04B 10/077* (2013.01)
*H04B 17/00* (2015.01)

(52) U.S. Cl.
CPC ........ *H04L 27/2607* (2013.01); *H04L 27/2627* (2013.01); *H04B 10/0775* (2013.01); *H04B 17/0085* (2013.01); *H04B 17/0087* (2013.01)

(58) Field of Classification Search
CPC ... H04B 10/0775; H04B 17/00; H04B 17/009
USPC .......................................................... 375/227
See application file for complete search history.

(56) References Cited

U.S. PATENT DOCUMENTS

| | | |
|---|---|---|
| 2005/0068886 A1* | 3/2005 | Wang et al. .................... 370/210 |
| 2009/0094492 A1* | 4/2009 | Music et al. ................... 714/715 |
| 2010/0118818 A1 | 5/2010 | Ahn et al. |

* cited by examiner

*Primary Examiner* — Michael Neff
(74) *Attorney, Agent, or Firm* — Carter, DeLuca, Farrell & Schmidt, LLP

(57) ABSTRACT

A signal generator for creating a measuring signal comprising a cyclic prefix comprises a baseband signal generator for generating a baseband measuring signal and a channel emulator for emulating a channel in the baseband measuring signal resulting in a channel modified signal. Moreover, it comprises a modulator for modulating the channel modified signal and a cyclic prefix generating unit for generating and inserting a cyclic prefix into the modulated signal. The cyclic prefix generating unit is set up for generating the cyclic prefix in such a manner that a channel modified cyclic prefix is emulated.

12 Claims, 6 Drawing Sheets

SIGNAL GENERATOR AND SIGNAL GENERATION METHOD WITH CYCLIC PREFIX GENERATION

TECHNICAL FIELD

The invention relates to creating a measuring signal including a cyclic prefix, especially creating an OFDM signal.

BACKGROUND ART

In a classical signal generator, a baseband signal is generated and modulated. A cyclic prefix is then generated from a last part of the signal and added to the beginning of the signal. The resulting signal is passed through channel emulation means, which for example fade the signal and add noise. The resulting signal is the measuring signal, which is supplied to a device under test. Performing the signal generation by the above-described method though requires a great deal of processing power.

Recently, signal generators for multi-carrier signals have been proposed that include the application of static or fading channel models to the signal prior to signal modulation. Since the creation of a cyclic prefix though is a nonlinear operation, the resulting signal is different from a signal generated by the above-described classical signal generator. Since the channel affects the signal only before cyclic prefix insertion, the cyclic prefix, which is added to the beginning of each symbol, exactly corresponds to the end of the symbol. From a receiver perspective, this difference manifests in the autocorrelation properties of the received signal. The signal received from the signal generator will have ideal autocorrelation properties with distinct correlation peaks separated by symbol length plus cyclic prefix length. In comparison, a signal received from a classical signal generator will have degraded autocorrelation peaks that are shifted in time.

For example the US patent application US 2010/0118818 A1 shows a communication system using cyclic prefixes.

Accordingly, an object of the invention is to create a signal generator and a signal generation method capable of generating a measuring signal including a cyclic prefix which require a low computational power and at the same time achieve a measuring signal with auto correlation properties which are comparable to those of a measuring signal generated by a classical signal generator.

SUMMARY OF THE INVENTION

An inventive signal generator for creating a measuring signal comprising a cyclic prefix comprises a baseband signal generator for generating a baseband measuring signal and a channel emulator for emulating a channel in the baseband measuring signal resulting in a channel modified signal. Moreover, it comprises a modulator (e.g. in case of OFDM the modulator would usually be implemented as IFFT, Inverse Fast Fourier Transform) for modulating the channel modified signal and a cyclic prefix generating unit for generating and inserting a cyclic prefix into the modulated signal. The cyclic prefix generating unit is set up for generating the cyclic prefix emulating a channel modified cyclic prefix. It is therefore possible to retain the advantageous low-computational complexity of a signal generator employing the channel emulator before adding the cyclic prefix while, at the same time, achieving a measuring signal, which is comparable to the measuring signal of a classical signal generator, which employs the channel emulator as the last step.

Advantageously, the cyclic prefix generating unit is set up for generating the cyclic prefix emulating a signal-to-interference-ratio of a channel modified cyclic prefix. It is therefore possible to achieve auto correlation results, which are comparable to the results of a measuring signal generated by a classical signal generator.

Furthermore, it is advantageous that the channel used for emulating the signal to interference ratio is identical with the channel used for creating the channel modified baseband measuring signal. Especially ideal autocorrelation properties of the resulting measuring signal can thereby be achieved.

Advantageously, the cyclic prefix generating unit is set up for generating the cyclic prefix by generating a first signal corresponding to an end of a current symbol, generating a second signal corresponding to a beginning of a directly prior symbol, performing a windowing of the first signal and the second signal resulting in a windowed first signal and a windowed second signal, and adding the windowed first signal and the windowed second signal resulting in the cyclic prefix. The sequence of steps results in a very low computational complexity and, at the same time, in a measuring signal with the desired autocorrelation properties. By advantageously setting the window positions and width, it is possible to set the autocorrelation properties of the resulting measuring signal.

Even more advantageously, a third signal is generated corresponding to a part of a preceding symbol. Alternatively the third signal is generated by an independent signal source. For example, white Gaussian noise can be used. Also here, a windowing of the third signal is performed. This third signal is added to the first and second windowed signals. An even more accurate resemblance of a measuring signal generated by a classical signal generator can thereby be achieved. Therefore, the autocorrelation properties are even better matched to the autocorrelation properties of a measuring signal generated by a classical signal generator than using only a first and second signal.

Alternatively, in addition to first and second signals, further signals corresponding to parts of at least one preceeding symbol or from other signal sources can be used. For each of these signals, a windowing is performed resulting in windowed further signals. All of the resulting window signals are then added up resulting in the cyclic prefix. A very accurate resemblance of the autocorrelation properties of a measuring signal generated by a classical signal generator can thereby be achieved.

An inventive signal generation method serves the purpose of creating a measuring signal comprising a cyclic prefix. In a first step a baseband signal is generated. In a second step, a channel emulation is performed on the baseband measuring signal resulting in a channel modified signal. A modulation is performed on the signal resulting in a modulated signal. In a fourth step a cyclic prefix is generated and inserted into the modulated signal. The cyclic prefix is generated so that a channel modified cyclic prefix is emulated. While retaining a low computational complexity, advantageous autocorrelation properties of the resulting measuring signal can thereby be achieved.

BRIEF DESCRIPTION OF THE DRAWINGS

An exemplary embodiment of the invention is now further explained by way of example only with respect to the drawings, in which.

DETAILED DESCRIPTION OF THE PREFERRED EMBODIMENTS

Reference will now be made in detail to the preferred embodiments of the present invention, examples of which are illustrated in the accompanying drawings. However, the following embodiments of the present invention may be variously modified and the range of the present invention is not limited to the following embodiments.

Figure 1:
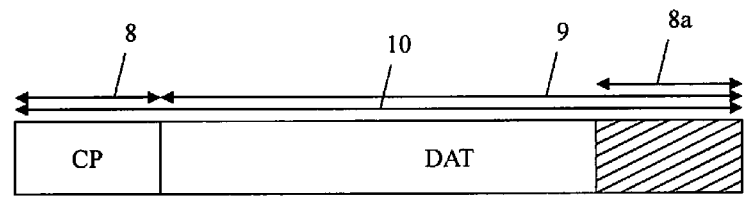
FIG. 1 shows an exemplary symbol.
Figure 2:
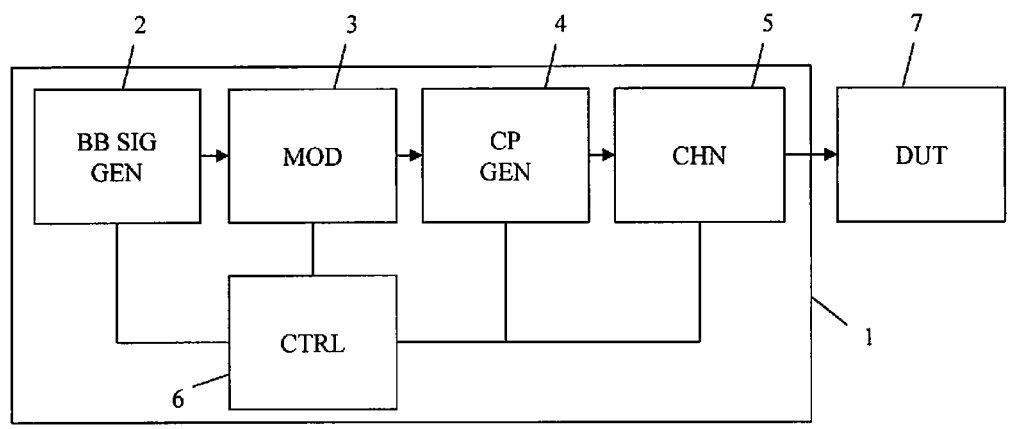
FIG. 2 shows an exemplary signal generator.
Figure 3:
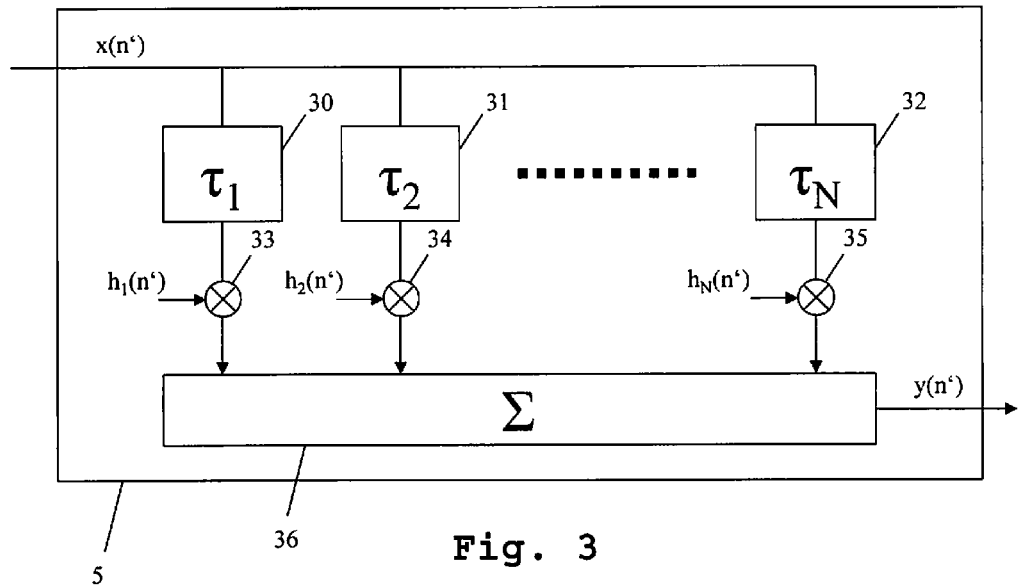
FIG. 3 shows an exemplary fading model.

First we demonstrate the setup and function of a cyclic prefix and of an exemplary signal generator along FIGS. 1-3. With respect to FIGS. 4-7 the function of an embodiment of the inventive signal generator is described in detail. Finally along FIG. 8 and FIG. 9, the function of an embodiment of the inventive signal generation method is described. Similar entities and reference numbers in different figures have been partially omitted.

In FIG. 1, a typical OFDM symbol 9 is shown. A cyclic prefix 8 is added at the beginning of the symbol 9 and is identical to a last part 8a of the symbol 9. The symbol 9 and the cyclic prefix 8 are referred to together as reference number 10.

In FIG. 2, an exemplary signal generator 1 is shown. The signal generator 1 comprises a baseband signal generator 2 which is connected to a modulator 3, which again is connected to cyclic prefix generation unit 4, which again is connected to a channel emulator 5. All of the units 2-5 are connected to control means 6, which control the units 2-5.

The control means 6 control the baseband signal generator 2 so that it generates a baseband signal. The baseband signal is passed on to the modulator 3, which modulates the baseband signal. The resulting modulated signal is handed on to the cyclic prefix generating unit 4, which generates a cyclic prefix from the last part 8a of the symbol 9 and adds it to the beginning of the symbol 9 as cyclic prefix 8. The resulting signal is then passed on to the channel emulator 5, which emulates a transmission of the signal through a transmission channel. The resulting measuring signal is then handed on to a device under test 7, which is not part of the signal generator 1. A measurement is performed using the generated measuring signal.

The signal generator 1 is connected to the device under test 7 in a digital manner here. Alternatively, the signal generator can additionally comprise a digital-analog-converter connected to the channel emulator 5 and a radio frequency mixer connected to the digital-analog-converter. In this case, the device under test 7 is connected to the radio frequency mixer. The analog-digital-converter is then setup for converting the digital output signal of the channel emulator 5 into an analog signal. The radio frequency mixer is setup for mixing the analog signal to a radio frequency. The device under test then sees a radio frequency measuring signal.

In FIG. 3, a typical channel emulator 5 of FIG. 2 is shown in detail. The channel emulator 5 comprises a number of delay elements 30, 31, 32, which are each connected in parallel to the cyclic prefix generating unit 4 of FIG. 2. Therefore, each of the delay units 30-32 is provided with the not yet channel modified measuring signal. The delay units 30-32 each create a different delay time within the supplied signal. After passing the delay units 30-32, the individually delayed signals are handed to multipliers 33, 34 and 35, which multiply the respective signal with additional signals $h_1(n')$, $h_2(n')$, $h_N(n')$. The resulting signals are then handed over to an adder 36, which adds up the individual multiplied signals and outputs a final sum signal as measuring signal $y(n')$. By the use of the delay units 30-32, especially reflections in a real world-environment, can be emulated.

First Embodiment

Figure 4:
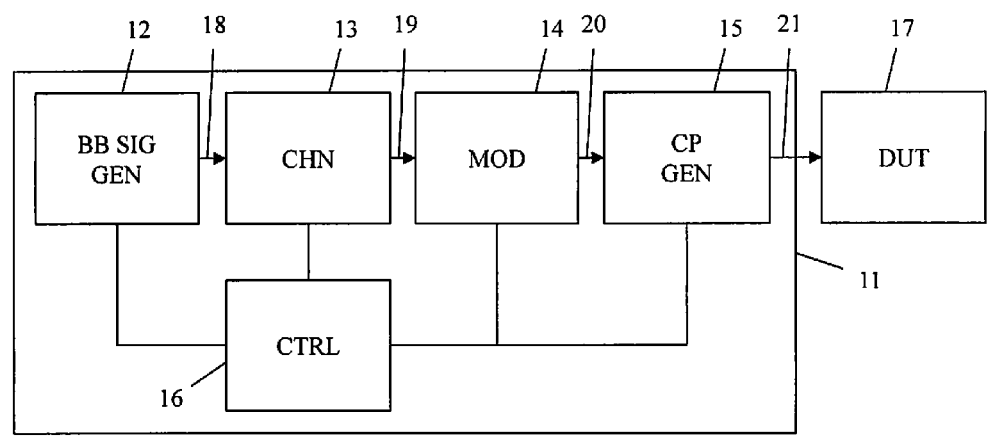
FIG. 4 shows an embodiment of the present invention in a block diagram.

In FIG. 4, an exemplary embodiment of the inventive signal generator 11 is shown. The signal generator 11 comprises a baseband signal generator 12, which is connected to a channel emulator 13, which again is connected to a modulator 14, which is furthermore connected to a cyclic prefix generating unit 15. All of these units are connected to control means 16, which control them. A device under test 17 is connected to the cyclic prefix generating unit 15.

The signal generator 11 is connected to the device under test 17 in a digital manner here. Alternatively, the signal generator can additionally comprise a digital-analog-converter connected to the cyclic prefix generating unit 15 and a radio frequency mixer connected to the digital-analog-converter. In this case, the device under test 17 is connected to the radio frequency mixer. The analog-digital-converter is then setup for converting the digital output signal of the cyclic prefix generating unit 15 into an analog signal. The radio frequency mixer is setup for mixing the analog signal to a radio frequency. The device under test then sees a radio frequency measuring signal.

The baseband signal generator 12 is configured for generating a baseband measuring signal 18, which is handed on to the channel emulator 13. The channel emulator 13 emulates a transmission channel over which the baseband measuring signal 18 is transmitted. A resulting channel modified signal 19 is handed on to the modulator, which modulates it resulting in a modulated signal 20. The modulated signal 20 is handed on to the cyclic prefix generating unit 15, which generates a cyclic prefix for each symbol of the modulated signal 20 and adds it to the beginning of the respective symbol. A resulting measuring signal 21 is supplied to a device under test 17. A measurement may be performed using this measuring signal.

Figure 5:
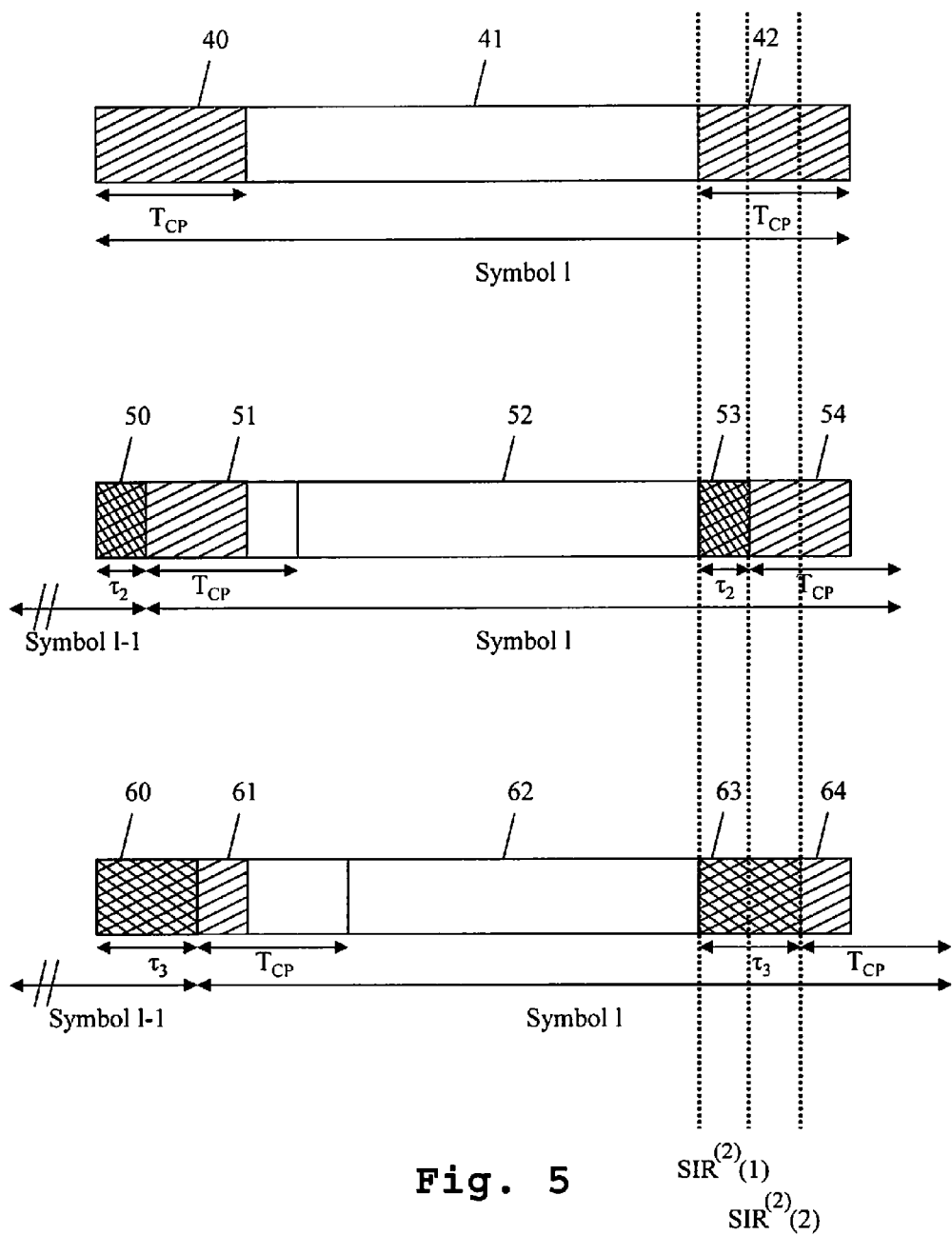
FIG. 5 shows consecutive symbols of a baseband signal used for generating the cyclic prefix.
Figure 6:
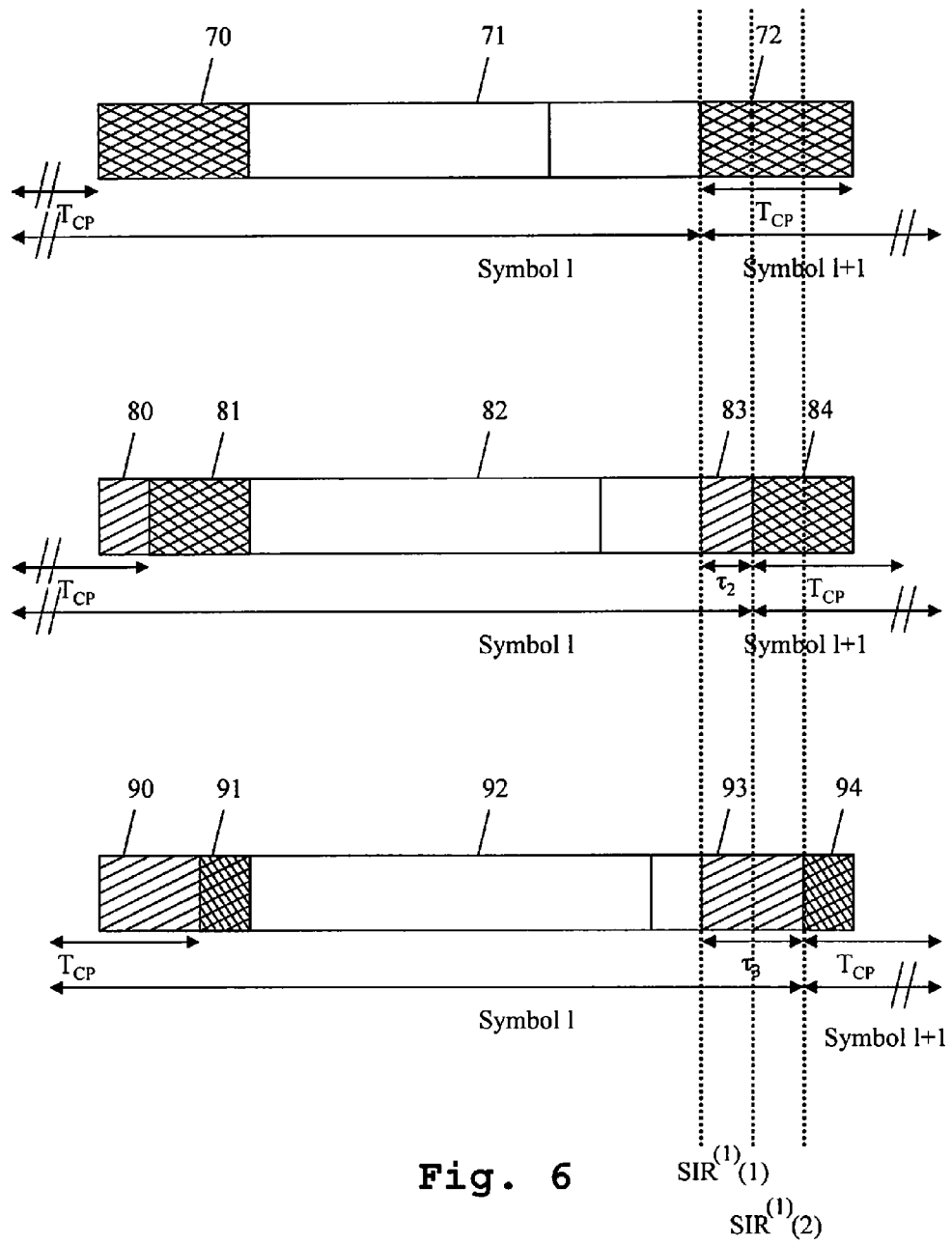
FIG. 6 shows consecutive symbols of a baseband signal used for generating the cyclic prefix.

The ascending and descending parts of autocorrelation functions of a multipath signal are depicted in FIG. 5 and FIG. 6. In FIG. 5 the ascending part is depicted, while in FIG. 6 the descending part is depicted. In these figures it is assumed that we are dealing with a multipath fading channel with 3 paths or equivalently $N_{Tap}=3$ and $\tau_1=0$. The figures show the signal and its delayed versions that would be received from a device under test if the signal is generated according to FIG. 2. Actually, the device under test would see the sum of the three signals depicted per figure. The once hatched signal parts 40, 42, 51, 54, 61, 64, 80, 83, 90, 93 contribute positively to the autocorrelation. The double hatched parts 50, 53, 60, 63, 70, 72, 81, 84, 91, 94 give no positive contribution to the autocorrelation. According to this interpretation, two (in general $N_{Tap}-1$, wherein $N_{Tap}$ corresponds to a number of taps in the used channel model) signal-to-interference-ratio regions (where the term interference denotes the signal parts that give no positive contribution to the autocorrelation, i.e. 50, 53, 60, 63) with finite signal-to-interference-ratio $SIR^{(2)}(1)$, $SIR^{(2)}(2)$ can be defined with respect to the ascending part of the autocorrelation function, compare FIG. 5:

$$SIR^{(2)}(1) = \frac{\sigma_1^2}{\sigma_2^2 + \sigma_3^2}, \quad SIR^{(2)}(2) = \frac{\sigma_1^2 + \sigma_2^2}{\sigma_3^2} \quad (1)$$

Also two signal-to-interference-ratio regions (again the term interference denotes the signal parts that give no positive contribution to the autocorrelation, i.e. 70, 72, 81, 84, 91, 94) with finite signal-to-interference-ratio $SIR^{(1)}(1)$, $SIR^{(1)}(2)$ can be defined with respect to the descending part of the autocorrelation function, compare FIG. 6:

$$SIR^{(1)}(1) = \frac{\sigma_2^2 + \sigma_3^2}{\sigma_1^2}, \quad SIR^{(1)}(2) = \frac{\sigma_3^2}{\sigma_1^2 + \sigma_2^2} \quad (2)$$

Here $\sigma_{tap}^2$ denotes the variance of $h_{tap}(n')$, where $h_{tap}(n')$ is defined through the tapped delay line channel model depicted in FIG. 3, tap is a index with $1 \leq tap \leq N_{Tap}$ and n' is a sample index with reference to $T_s$. ($T_s = 1/f_s$ and $f_s$ is the sample rate of the signal $x(n')$). Note that the channel is in general but not necessarily time variant.

Generally for $N_{Tap}$ taps we have $$SIR^{(1)}(i) = \frac{\sum_{tap=i+1}^{N_{tap}} \sigma_{tap}^2}{\sum_{tap=1}^{i} \sigma_{tap}^2}, \quad SIR^{(2)}(i) = \frac{\sum_{tap=1}^{i} \sigma_{tap}^2}{\sum_{tap=i+1}^{N_{tap}} \sigma_{tap}^2} \quad (3)$$

where i with $1 \leq i < N_{Tap}$ is the signal-to-interference region index.

Figure 7:
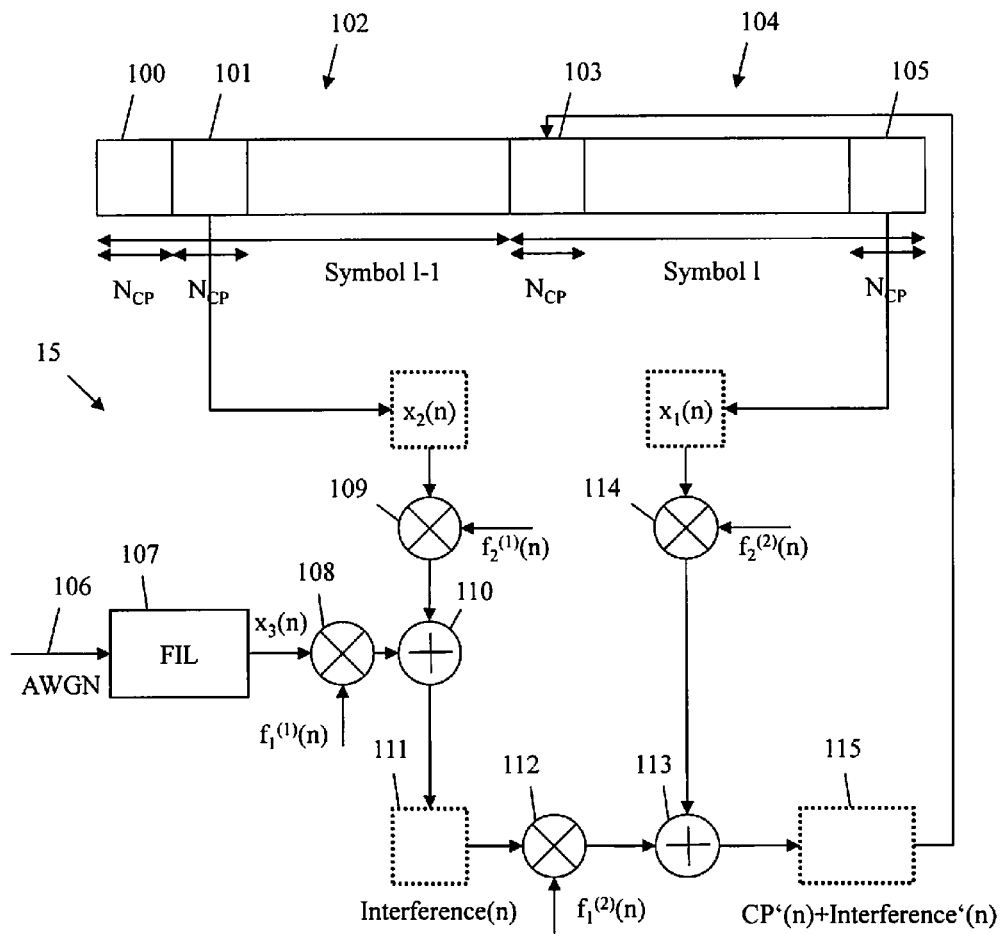
FIG. 7 shows details of the embodiment of the inventive measuring device in a block diagram.

In FIG. 7, a detail of the cyclic prefix generation unit 15 of FIG. 4 is shown in a block diagram. In this figure and in the following text n is a sample index with reference to $T_s$ ($T_s = 1/f_s$ and $f_s$ is the sample rate of the signal 20 at the output of the modulator) and $0 \leq n < N_{CP} + N_{Delta}$, $N_{CP}$ denotes the number of CP samples and $N_{Delta}$ is defined as:

$$N_{Delta} = \max\left\{0, \left\lceil \frac{\max_{1 \leq tap \leq N_{Tap}} \{\tau_{tap}\}}{T_s} \right\rceil - N_{CP} \right\} \quad (4)$$

where $\tau_{tap}$ denotes the delay of the respective tap in the channel model. In FIG. 7, $N_{Delta}$ is 0.

The bandwidth of the lowpass filter 107 should preferably be chosen in a way that the bandwidth of $x_3(n)$ corresponds to the bandwidth of $x_2(n)$ (note that filtered AWGN is only one of numerous possibilities to generate $x_3(n)$ and the usage of $x_3(n)$ is by itself optional).

$X_1(n)$, $x_2(n)$ and $x_3(n)$ are first, second and third signals used for generating the cyclic prefix.

Functions $f_1^{(1)}(n)$, $f_2^{(1)}(n)$, $f_1^{(2)}(n)$ and $f_2^{(2)}(n)$ could for example be chosen such that the signal-to-interference-ratio with respect to the generated signal is adjusted according to equations (3):

$$f_1^{(1)}(n) = \begin{cases} \sqrt{\frac{1}{1 + SIR^{(1)}(i)}} & \tau_i \leq nT_s < \tau_{i+1} \\ 1 & \tau_{N_{Tap}} \leq nT_s < (N_{CP} + N_{Delta})T_s \end{cases} \quad (5)$$

$$f_2^{(1)}(n) = \begin{cases} \sqrt{\frac{SIR^{(1)}(i)}{1 + SIR^{(1)}(i)}} & \tau_i \leq nT_s < \tau_{i+1} \\ 0 & \tau_{N_{Tap}} \leq nT_s < (N_{CP} + N_{Delta})T_s \end{cases} \quad (6)$$

$$f_1^{(2)}(n) = \begin{cases} \sqrt{\frac{1}{1 + SIR^{(2)}(i)}} & \tau_i \leq nT_s < \tau_{i+1} \\ 0 & \tau_{N_{Tap}} \leq nT_s < (N_{CP} + N_{Delta})T_s \end{cases} \quad (7)$$

$$f_2^{(2)}(n) = \begin{cases} \sqrt{\frac{SIR^{(2)}(i)}{1 + SIR^{(2)}(i)}} & \tau_i \leq nT_s < \tau_{i+1} \\ 1 & \tau_{N_{Tap}} \leq nT_s < (N_{CP} + N_{Delta})T_s \end{cases} \quad (8)$$

taking into account that $\text{var}(x_3(n)) = \text{var}(x_2(n)) = P$, var indicating the variance, Equations (5) to (6) can be derived by noting that $$\text{Interference} = f_1^{(1)}(n) * x_3(n) + f_2^{(1)}(n) * x_2(n)$$

thus the signal-to-interference-ratio of Interference(n) is given as $$SIR(n) = \frac{(f_2^{(1)}(n))^2}{(f_1^{(1)}(n))^2}$$

and the variance of Interference(n) is given as $$\text{var}(\text{Interference}(n)) = ((f_1^{(1)}(n))^2 + (f_2^{(1)}(n))^2) * P$$

demanding that $$\text{var}(\text{Interference}(n)) = \text{var}(x^3(n)) = \text{var}(x_2(n)) = P \text{ and}$$

$$SIR(n) = SIR^{(1)}(n), \text{ where}$$

$$SIR^{(1)}(n) := \begin{cases} SIR^{(1)}(i) & \tau_i \leq nT_s < \tau_{i+1} \\ 0 & \tau_{N_{Tap}} \leq nT_s < (N_{CP} + N_{Delta})T_s \end{cases}$$

is equivalent to $$(f_1^{(1)}(n))^2 + (f_2^{(1)}(n))^2 = 1 \text{ and}$$

$$\frac{(f_2^{(1)}(n))^2}{(f_1^{(1)}(n))^2} = SIR^{(1)}(n)$$

which leads to the following linear system of equations with the unknowns $(f_1^{(1)}(n))^2$ and $(f_2^{(1)}(n))^2$:

$$(f_1^{(1)}(n))^2 + (f_2^{(1)}(n))^2 = 1$$

$$(f_2^{(1)}(n))^2 - SIR^{(1)}(n) * (f_1^{(1)}(n))^2 = 0$$

the solution of this system is easily found as $$(f_1^{(1)}(n))^2 = \frac{1}{1 + SIR^{(1)}(n)}$$

-continued $$(f_2^{(1)}(n))^2 = \frac{SIR^{(1)}(n)}{1+SIR^{(1)}(n)}$$

which directly leads to equations (5) and (6).

Equations (7) and (8) can be derived accordingly except that $SIR^{(2)}(n)$ is defined as $$SIR^{(2)}(n) := \begin{cases} SIR^{(2)}(i) & \tau_i \leq nT_s < \tau_{i+1} \\ \infty & \tau_{N_{Tap}} \leq nT_s < (N_{CP}+N_{Delta})T_s \end{cases}.$$

Another reasonable choice of the functions $f_1^{(1)}(n)$, $f_2^{(1)}(n)$, $f_1^{(2)}(n)$ and $f_2^{(2)}(n)$ could be to choose them in a way such that the SIR with respect to the autocorrelation function of the generated signal is adjusted according to equations (3):

$$f_1^{(1)}(n) = \begin{cases} \sqrt{\frac{2}{1+SIR^{(1)}(i)}} & \tau_i \leq nT_s < \tau_{i+1} \\ \sqrt{2} & \tau_{N_{Tap}} \leq nT_s < (N_{CP}+N_{Delta})T_s \end{cases} \quad (9)$$

$$f_2^{(1)}(n) = \begin{cases} \sqrt{\frac{SIR^{(1)}(i)-1}{SIR^{(1)}(i)+1}} & \tau_i \leq nT_s < \tau_{i+1} \\ j & \tau_{N_{Tap}} \leq nT_s < (N_{CP}+N_{Delta})T_s \end{cases} \quad (10)$$

$$f_1^{(2)}(n) = \begin{cases} \sqrt{\frac{2}{1+SIR^{(2)}(i)}} & \tau_i \leq nT_s < \tau_{i+1} \\ 0 & \tau_{N_{Tap}} \leq nT_s < (N_{CP}+N_{Delta})T_s \end{cases} \quad (11)$$

$$f_2^{(2)}(n) = \begin{cases} \sqrt{\frac{SIR^{(2)}(i)-1}{SIR^{(2)}(i)+1}} & \tau_i \leq nT_s < \tau_{i+1} \\ 1 & \tau_{N_{Tap}} \leq nT_s < (N_{CP}+N_{Delta})T_s \end{cases} \quad (12)$$

where $j=\sqrt{-1}$.

The derivation of equations (9) to (12) follows the same steps as the derivation of equations (5) to (8) except that $$SIR(n) = \frac{(f_2^{(1)}(n))^2}{(f_1^{(1)}(n))^2}$$

is replaced by $$SIR(n) = \frac{(f_2^{(1)}(n))^2 + 1}{(f_1^{(1)}(n))^2}.$$

Window functions $w_1(n)$, $w_2(n)$ and $w_3(n)$ are given as:

$$w_1(n)=f_2^{(2)}(n) \quad (13)$$

$$w_2(n)=f_2^{(1)}(n)*f_1^{(2)}(n) \quad (14)$$

$$w_3(n)=f_1^{(1)}(n)*f_1^{(2)}(n) \quad (15)$$

The first signal, second signal and third signal are equivalent to $x_1(n)$, $x_2(n)$ and $x_3(n)$ respectively.

Then the inventive CP is given as:

$$CP(n)=w_1(n)x_1(n)+w_2(n)x_2(n)+w_3(n)x_3(n) \quad (16)$$

The processing steps corresponding to the means depicted in FIG. 7 have to be performed for each symbol.

Note that equations (14) and (15) show that the values of $f_1^{(1)}(n)$ and $f_2^{(1)}(n)$ on the interval $\tau_{N_{Tap}} \leq nT_s < (N_{CP}+N_{Delta})T_s$ which are formally derived in equations (5), (6), (9) and (10) as 1, 0, $\sqrt{2}$ and j respectively, could also be set to zero (or any other value) for easier implementation, since on this interval $w_2(n)$ and $w_3(n)$ are nulled from $f_1^{(2)}(n)$ anyway.

Note that in this embodiment the functions $f_x^{(y)}(n)$ are real functions. In general they could also be complex. In this embodiment our inventive cyclic prefix generation method is applied for a Single Input Single Output system with one transmit and one receive antenna ($N_{Tx}=N_{Rx}=1$, wherein $N_{Tx}$ is a number of transmit antennas and $N_{Rx}$ is a number of receiver antennas). It can of course also be applied for Multiple Input Multiple Output systems with $N_{Tx}>1$ and/or $N_{Rx}>1$. In this case our inventive method has to be applied to each of the $N_{Rx}$ symbols to be generated per symbol plus cyclic prefix time.

More precisely, the cyclic prefix generation unit 15 comprises a multiplier 109, which is connected to an adder 110. Moreover, a filter 107 is connected to a further multiplier 108, which again is connected to the adder 110. The adder 110 is furthermore connected to a multiplier 112, which again is connected to an adder 113. A further multiplier 114 is also connected to the adder 113.

The last part 105 of the current symbol 104 is used as a first signal $x_1(n)$. This signal is supplied to the multiplier 114 and multiplied with a signal $f_2^{(2)}(n)$. The resulting signal is supplied to the adder 113.

A signal part 101 of a prior symbol 102, which starts directly after the cyclic prefix of the previous symbol 102 and has the length of the cyclic prefix $N_{CP}$ is used as a second signal $x_2(n)$ and supplied to the multiplier 109. It is multiplied by the signal $f_2^{(1)}(n)$. The generation of this signal is described earlier.

The resulting signal is passed on to the adder 110. A noise signal 106 is supplied to the filter 107, which performs a filtering in such a manner that the noise signal has the same bandwidth as the intended measuring signal. The noise signal 106 can advantageously be a wide noise signal. Alternatively, it can also be derived from prior symbols.

The resulting signal $x_3(n)$ is supplied to the multiplier 108 and multiplied thereby with the signal $f_1^{(1)}(n)$. The resulting signal is also supplied to the adder 110 and added to the signal resulting from the multiplier 109. The resulting signal 111 is furthermore multiplied by the multiplier 112 with the signal $f_1^{(2)}(n)$. The resulting signal is supplied to the adder 113.

The adder 113 adds the previously described signal and the signal resulting from the multiplier 114 resulting in a channel modified cyclic prefix signal 115. This signal is used as the cyclic prefix 103 of the current symbol 104.

Second Embodiment

Figure 8:
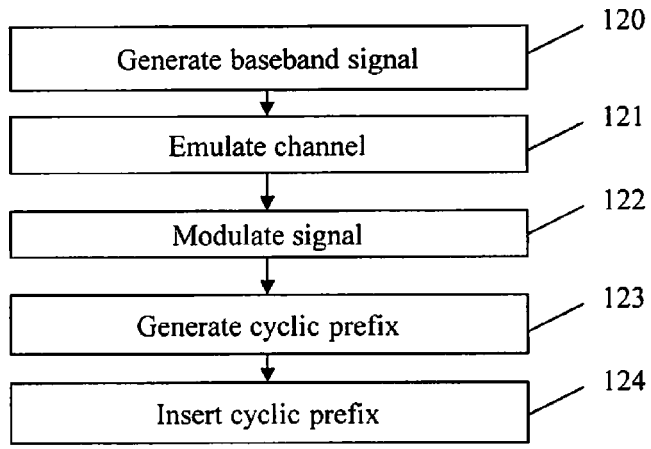
FIG. 8 shows a flow chart of an embodiment of the inventive measuring method.

In FIG. 8, an embodiment of the inventive signal generation method is shown. In a first step 120, a baseband signal is generated. In a second step 121, a channel emulation is performed on the baseband signal. In a third step 122, the resulting signal is modulated. In a fourth step 123, a cyclic prefix is generated as explained with regard to FIG. 5-7. In a fifth step 124, the generated cyclic prefix is inserted. The resulting signal is the final measuring signal.

Figure 9:
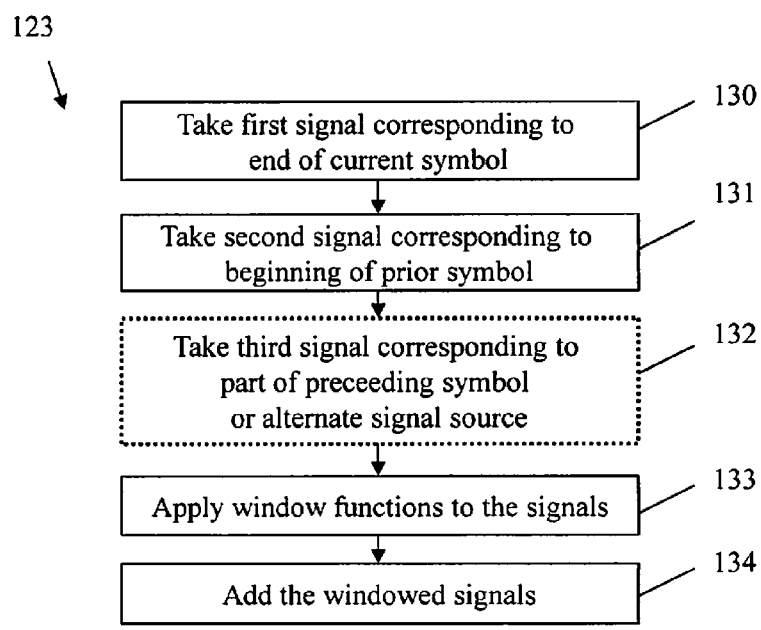
FIG. 9 shows a detailed flow chart of the embodiment of the inventive measuring method.

In FIG. 9, a detail of the embodiment of the inventive signal generating method shown in FIG. 8 is shown. In FIG. 9, the fourth step 123 is expanded. In a first step 130, a first signal corresponding to the end of the current symbol is taken. The signal corresponds to the signal part 105 of FIG. 7. In a second step 131, a second signal corresponding to a beginning of a prior symbol is taken. This second signal corresponds to the signal part 101 of FIG. 7. In a third step 132, which is an optional step, a third signal corresponding to a part of a preceeding symbol or corresponding to alternate signal sources is taken. In a fourth step 133, window functions are applied to all of the above-taken signals. In a final fifth step 134, the windowed signals are added in order to emulate the channel modified cyclic prefix.

In addition to the optional third step 132, further signals also corresponding to parts of preceeding symbols or alternate signal sources can be added in order to achieve a measuring signal even better matched to the autocorrelation properties of a measuring signal generated by a classical signal generator.

The invention is not limited to the examples and especially not to the OFDM transmission scheme. The invention discussed above can be applied to any signals comprising a cyclic prefix. The characteristics of the exemplary embodiments can be used in any combination.

The embodiments of the present invention can be implemented by hardware, firmware, software, or any combination thereof. Various embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

Various embodiments of the present invention may also be implemented in the form of software modules, processes, functions, or the like which perform the features or operations described above. Software code can be stored in a memory unit so that it can be executed by a processor. The memory unit may be located inside or outside the processor and can communicate data with the processor through a variety of known means.

Although the present invention and its advantages have been described in detail, it should be understood that various changes, substitutions and alterations can be made herein without departing from the spirit and scope of the invention as defined by the appended claims.

What is claimed is:

1. A signal generator for creating a measuring signal comprising a cyclic prefix, comprising:
    a baseband signal generator for generating a baseband measuring signal;
    a channel emulator for emulating a channel in the baseband measuring signal resulting in a channel modified signal;
    a modulator for modulating the channel modified signal resulting in a modulated signal; and
    a cyclic prefix generating unit for generating and inserting a cyclic prefix into the modulated signal,
    wherein the cyclic prefix generating unit is set up for generating the cyclic prefix in such a manner that a channel modified cyclic prefix is emulated, and
    wherein the cyclic prefix generating unit is set up for generating the cyclic prefix emulating a signal-to-interference-ratio of a channel modified cyclic prefix.

2. The signal generator according to claim 1, wherein the channel used for emulating the signal-to-interference-ratio is identical to the channel used for creating the channel modified signal.

3. The signal generator according to claim 1, wherein the cyclic prefix generating unit is set up for generating the cyclic prefix by:
    generating a first signal corresponding to an end of a current symbol,
    generating a second signal corresponding to a beginning of a directly prior symbol,
    performing a windowing of the first signal and the second signal resulting in a windowed first signal and a windowed second signal, and
    adding the windowed first signal and the windowed second signal.

4. The signal generator according to claim 3, wherein the cyclic prefix generating unit is set up for generating the cyclic prefix by:
    generating a third signal corresponding to a part of a preceding symbol or from another signal source,
    performing a windowing of the third signal resulting in a windowed third signal, and
    adding the windowed first signal, the windowed second signal, and the windowed third signal.

5. The signal generator according to claim 3, wherein the cyclic prefix generating unit is set up for generating the cyclic prefix by:
    generating further signals corresponding to parts of at least one preceding symbol or from other signal sources,
    performing a windowing of the further signals resulting in windowed further signals, and
    adding the windowed first signal, the windowed second signal, and the windowed further signals.

6. A signal generation method for creating a measuring signal comprising a cyclic prefix, comprising:
    generating a baseband measuring signal;
    emulating a channel in the baseband measuring signal resulting in a channel modified signal;
    modulating the channel modified signal resulting in a modulated signal; and
    generating and inserting a cyclic prefix into the modulated signal,
    wherein the cyclic prefix is generated in such a manner that a channel modified cyclic prefix is emulated, and
    wherein the cyclic prefix is generated in such a manner that a signal-to-interference-ratio of a channel modified cyclic prefix is emulated.

7. The signal generation method according to claim 6, wherein the channel used for emulating the signal-to-interference-ratio is identical to the channel used for creating the channel modified signal.

8. The signal generation method according to claim 6, wherein the cyclic prefix is generated by:
    generating a first signal corresponding to an end of a current symbol,
    generating a second signal corresponding to a beginning of a directly prior symbol,
    performing a windowing of the first signal and the second signal resulting in a windowed first signal and a windowed second signal, and
    adding the windowed first signal and the windowed second signal.

9. The signal generation method according to claim 8, wherein the cyclic prefix is generated by:
    generating a third signal corresponding to a part of a preceding symbol or from another signal source,
    performing a windowing of the third signal resulting in a windowed third signal, and
    adding the windowed first signal, the windowed second signal and the windowed third signal.

10. The signal generation method according to claim 8, wherein the cyclic prefix is generated by:

generating further signals corresponding to parts of at least one preceding symbol or from other signal sources, performing a windowing of the further signals resulting in windowed further signals, and adding the windowed first signal, the windowed second signal and the windowed further signals.

11. A signal generator for creating a measuring signal comprising a cyclic prefix, comprising:

a baseband signal generator for generating a baseband measuring signal;

a channel emulator for emulating a channel in the baseband measuring signal resulting in a channel modified signal;

a modulator for modulating the channel modified signal resulting in a modulated signal; and a cyclic prefix generating unit for generating and inserting a cyclic prefix into the modulated signal, wherein the cyclic prefix generating unit is set up for generating the cyclic prefix in such a manner that a channel modified cyclic prefix is emulated, and wherein the cyclic prefix generating unit is set up for generating the cyclic prefix by:

generating a first signal corresponding to an end of a current symbol, generating a second signal corresponding to a beginning of a directly prior symbol, performing a windowing of the first signal and the second signal resulting in a windowed first signal and a windowed second signal, and adding the windowed first signal and the windowed second signal.

12. A signal generation method for creating a measuring signal comprising a cyclic prefix, comprising:

generating a baseband measuring signal;

emulating a channel in the baseband measuring signal resulting in a channel modified signal;

modulating the channel modified signal resulting in a modulated signal; and generating and inserting a cyclic prefix into the modulated signal, wherein the cyclic prefix is generated in such a manner that a channel modified cyclic prefix is emulated, wherein the cyclic prefix is generated by:

generating a first signal corresponding to an end of a current symbol, generating a second signal corresponding to a beginning of a directly prior symbol, performing a windowing of the first signal and the second signal resulting in a windowed first signal and a windowed second signal, and adding the windowed first signal and the windowed second signal.

* * * * *